Sept. 25, 1956     E. STAMMWITZ     2,764,363
TRAVERSE MECHANISM FOR SPINNING, TWISTING AND LIKE FRAMES
Filed June 18, 1951     6 Sheets-Sheet 1
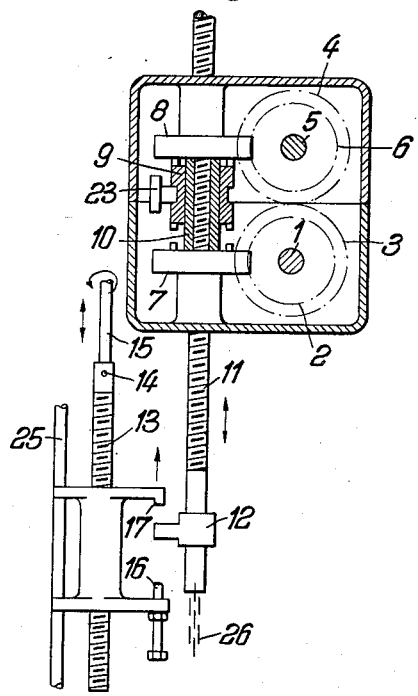
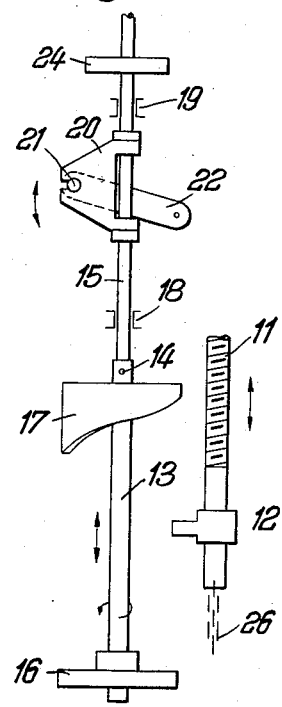
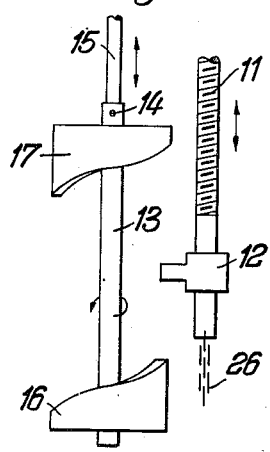
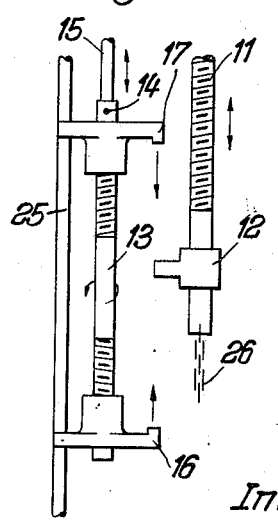
Inventor:
E. Stammwitz

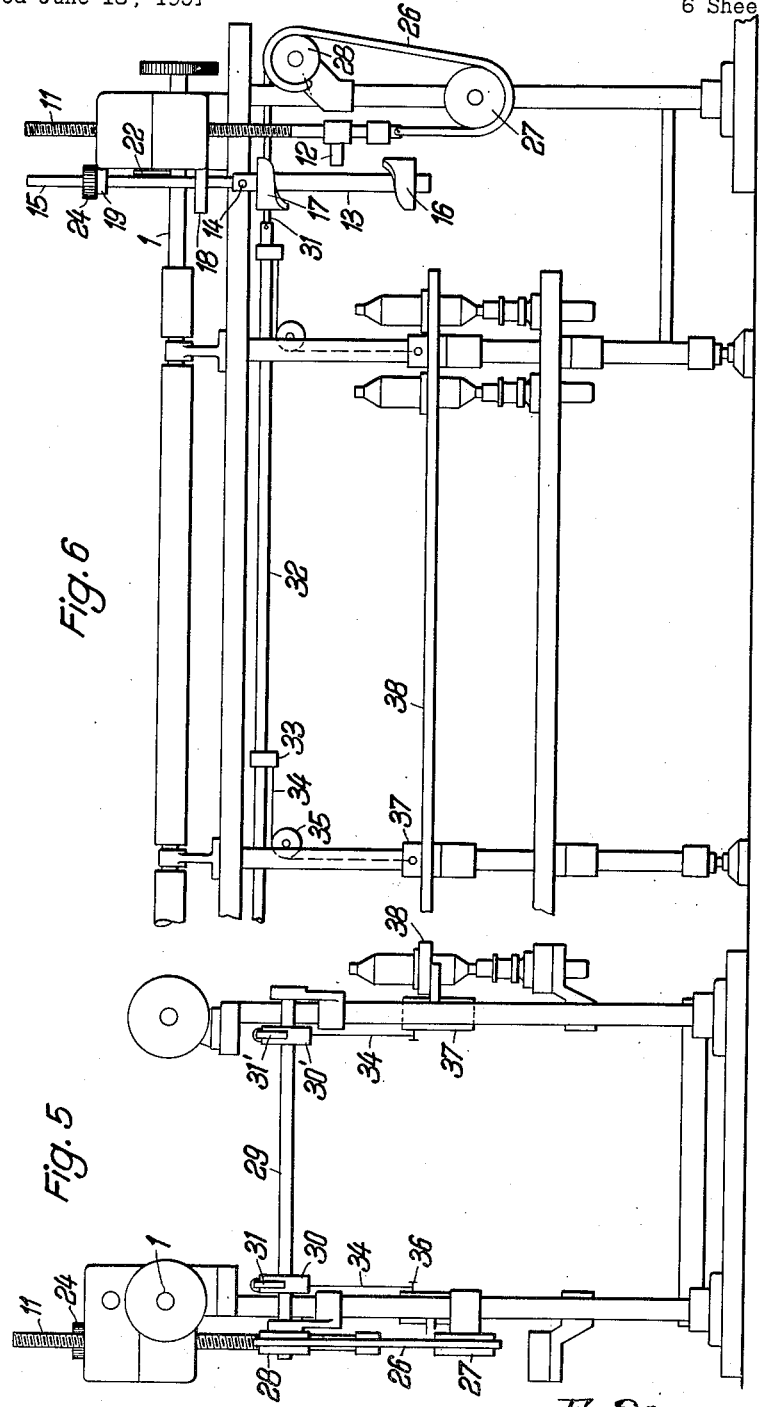

Sept. 25, 1956  E. STAMMWITZ  2,764,363
TRAVERSE MECHANISM FOR SPINNING, TWISTING AND LIKE FRAMES
Filed June 18, 1951  6 Sheets-Sheet 3
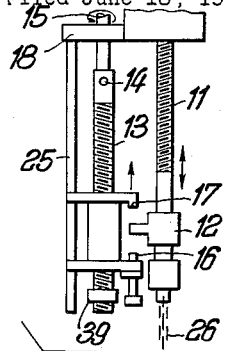
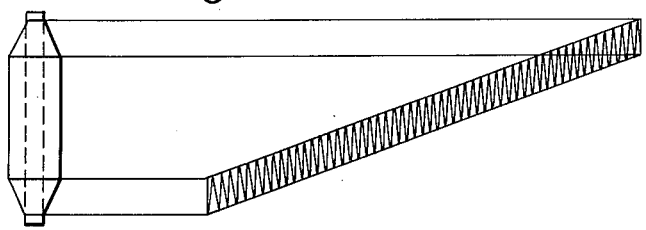
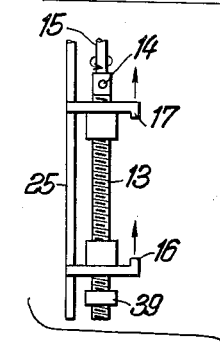
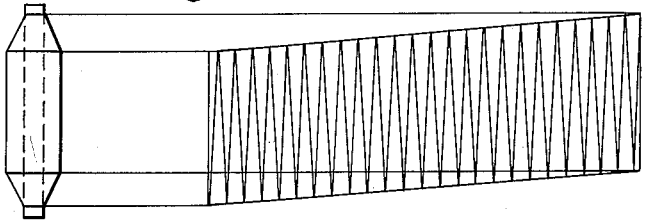
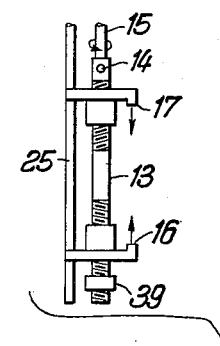
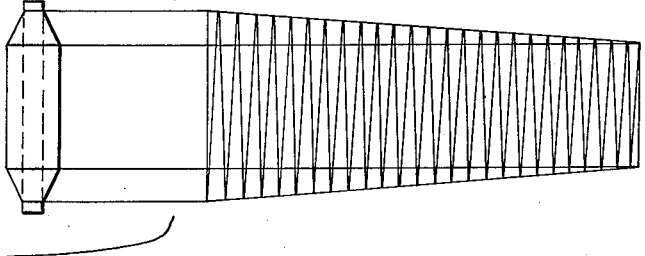
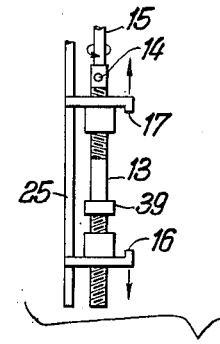
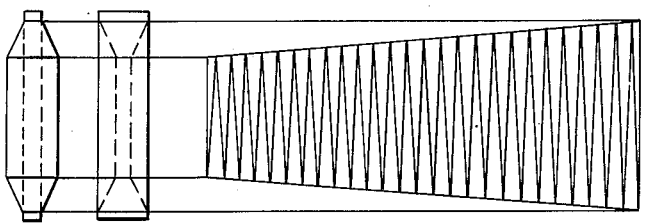
Inventor:
E. Stammwitz

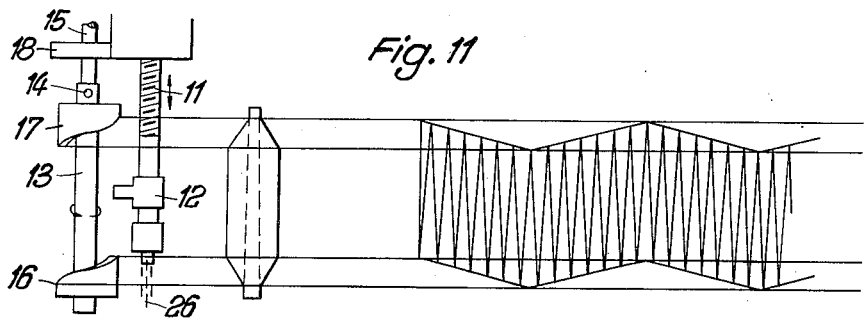
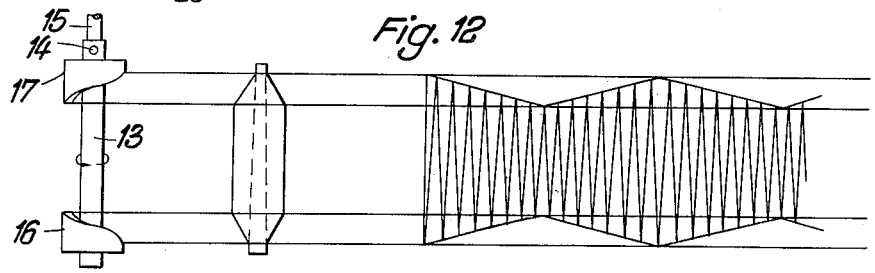
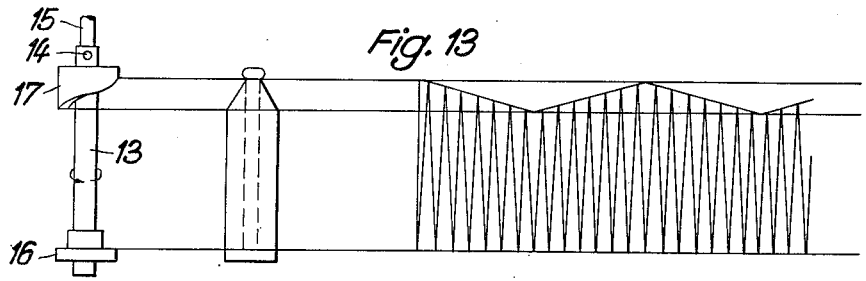
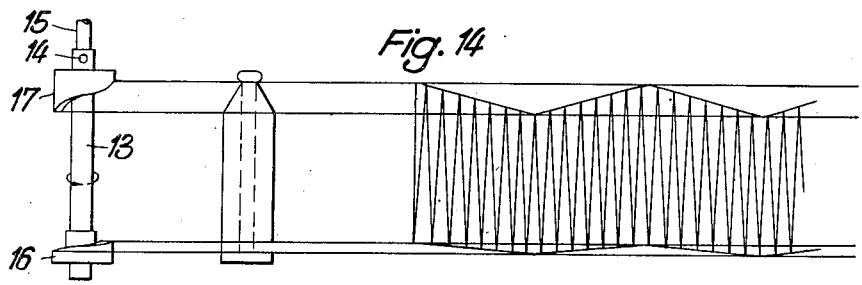
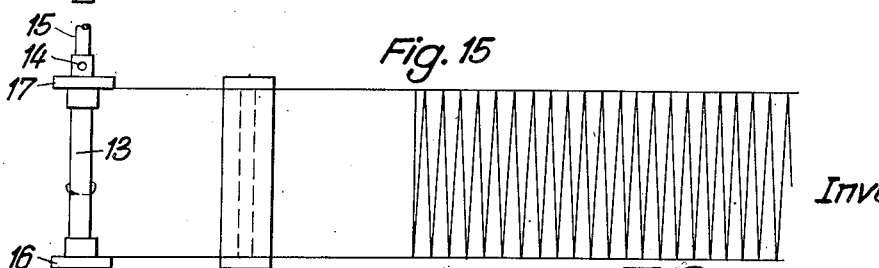

Sept. 25, 1956　　　　E. STAMMWITZ　　　　2,764,363
TRAVERSE MECHANISM FOR SPINNING, TWISTING AND LIKE FRAMES
Filed June 18, 1951.　　　　　　　　　　　　6 Sheets-Sheet 5
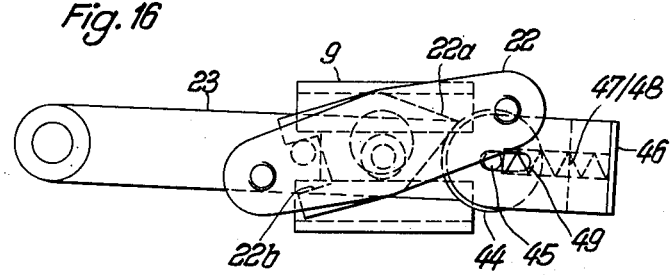
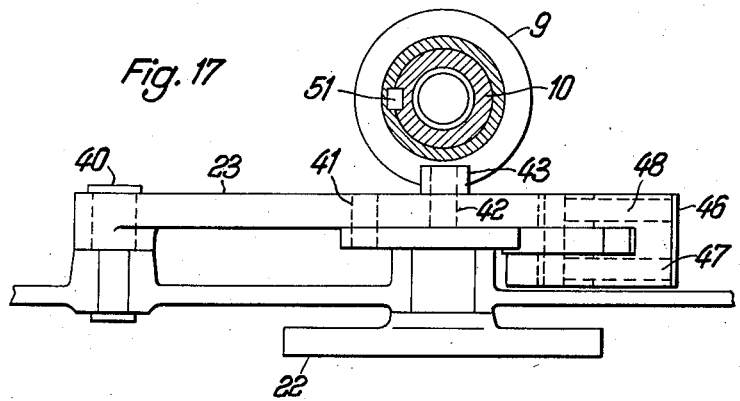
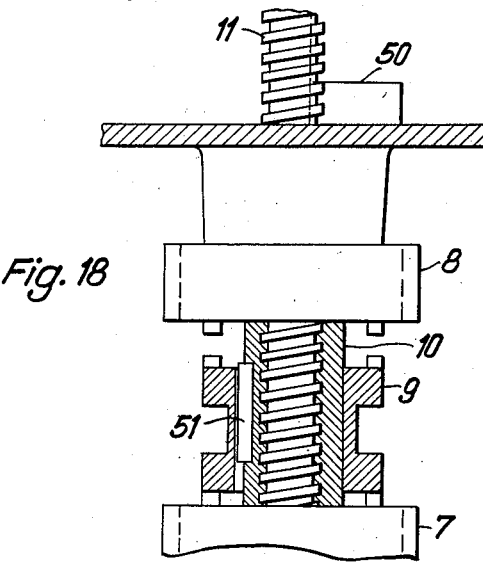
Inventor:
E. Stammwitz United States Patent Office 2,764,363
Patented Sept. 25, 1956

2,764,363

TRAVERSE MECHANISM FOR SPINNING, TWISTING AND LIKE FRAMES

Eugen Stammwitz, Kaiserslautern, Rheinpfalz, Germany

Application June 18, 1951, Serial No. 232,135

Claims priority, application Germany September 13, 1950

4 Claims. (Cl. 242—43.7)

In the hitherto known spinning, twisting and like frames the winding mechanism receives its motion impulses from a cam. This highly stressed machine element is, however, subjected to heavy wear which has a detrimental effect on the convolutions of the spooled thread. Cops or spools of frames, the cams of which are no longer in a good state, can during subsequent operations be unwound only at a low thread velocity and will even then be the cause of more frequent thread breakages.

Another feature of these frames is, that they are always arranged for only one definite kind of winding, either cop winding or parallel winding. If the kind of winding is to be changed, a time-wasting and costly reconstruction becomes necessary, that is, the entire winding mechanism has to be altered.

Insofar as frames are known, the winding arrangement of which operates without a cam, this arrangement can always only be used in connection with the particular frame construction and cannot be transferred to frames of other construction.

The invention does not only seek to overcome these disadvantages, but has for its main object, through the employment of reversing gear adapted to be regulated by control members, to make it possible to change from one kind of winding to another simply by changing differently formed and differently moved travel limiting stops under these control members. This can be brought about according to the invention through a draw-spindle connected, for instance, by a chain with the ring or spindle rail being actuated by a reversing gear in accordance with the to and fro motion of the ring or spindle rail. The draw-spindle acts by means of a stop on a control shaft actuating the said reversing gear, namely by way of a stop spindle provided on the control shaft and having counter stops corresponding to the stop on the draw-spindle. Owing to the construction according to the invention, the wear which is unavoidable in every mechanical gear will have no effect on the exactness of the spool winding. There is the further advantage, that the arrangement according to the invention calls for no special construction of the frame and can therefore be built into all frames hitherto operating with cams. Furthermore, according to the invention it is possible, by adjusting the stops which influence the change over, to wind bobbins of different length, without having to change any parts of the frame. It is thus also possible to spool bobbins of unusually great length without trouble in a perfectly satisfactory manner, which presented difficulties in the known frames employing cams.

Further details will be gathered from the constructional examples hereinafter described and illustrated in the accompanying drawing, in which:

Figure 1 shows the reversing gear according to the invention in combination with stroke limiting stops for winding cops;

Figure 2 the control arrangement in combination with stroke limiting stops for parallel winding;

Figure 3 stroke limiting stops for double cone winding through stroke displacement or stroke variation;

Figure 4 stroke limiting stops for double cone winding through shortening the stroke;

Figure 5 is an end view of a conventional spinning machine equipped with the invention;

Figure 6 is an elevational view of the machine shown in Figure 5;

Figure 19:
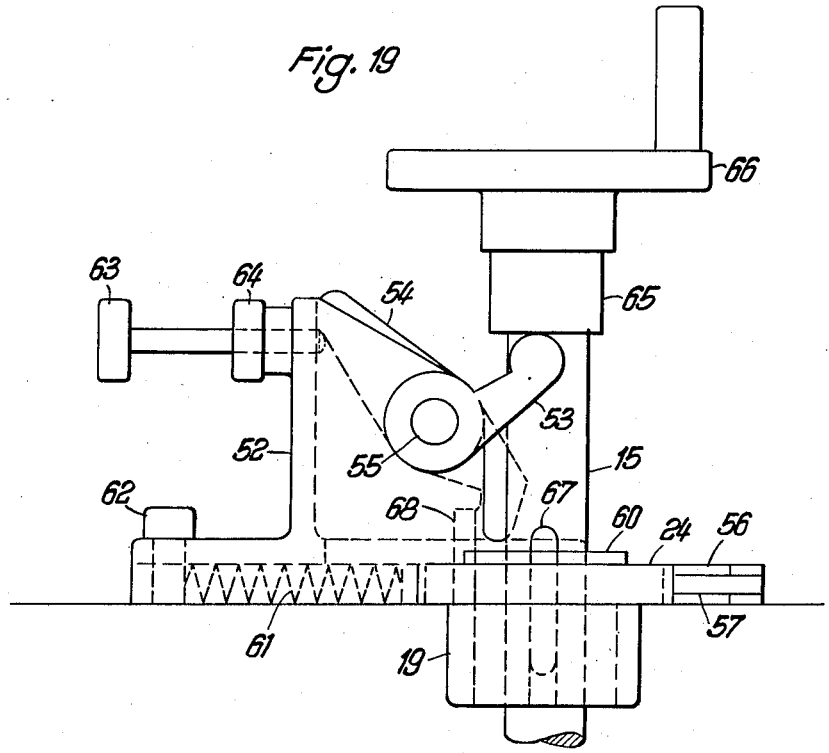
Figure 20:
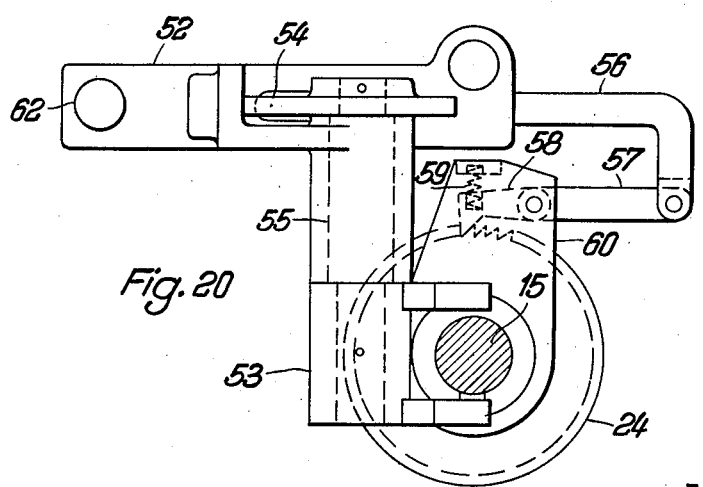

Figures 7 to 15 inclusive diagrammatically represent a number of examples of windings obtainable with the present invention;

Figure 16 is a view in side elevation of the connection between the control lever and the setting lever shown in Figure 1;

Figure 17 is a top plan view, partly in cross section of the assembly shown in Figure 16;

Figure 18 is an elevational view, partly in section of the connection between the double clutch and the nut with the draw spindle;

Figure 19 is a view in end elevation of the ratchet and pawl mechanism for turning the draw spindle; and Figure 20 is a top plan view for depicting the mechanism for turning the control shaft shown in Figure 19.

The reversing gear receives its drive directly or indirectly from the delivery cylinder on shaft 1, on which are mounted the worm wheel 2 and the spur wheel 3. The spur wheel 3 is in mesh with the spur wheel 4 on the shaft 5, on which is also mounted the worm wheel 6. The worm wheel 2 is in mesh with the worm wheel 7 and the worm wheel 6 with the worm wheel 8. The worm wheels 7 and 8 rotate in opposite directions and are provided at the sides facing one another with claws, in which engages alternately a double claw clutch 9 which is axially slidable on the nut 10. According to whether the clutch 9 is coupled with one worm wheel or the other, the nut 10 will be turned by means of a key in one sense or the other, whereby the draw-spindle 11 which is secured against turning is moved upwards and downwards. To the draw-spindle 11 is attached the chain 26 which through known means transmits the motion of the draw-spindle to the ring or spindle rail.

The automatic control of the gear and through it of the ring or spindle rail motion shall now be described with reference to Figure 2. On the draw-spindle 11 is mounted a fixed stop member 12. The stop spindle 13 is removably fixed by the screw 14 to the control shaft 15 and carries the stroke limiting stops 16 and 17. The control shaft 15 is rotatably and slidably supported in the bearings 18 and 19 and supports so as to be rotatable the coupling plate 20 which is connected by way of the pin 21 with the control lever 22 so as to rock about it. The control lever 22 is connected on the other hand with the lever 23 disposed in the gear casing, which with a stud engages in a groove of the double clutch 9, in such a manner that both levers and consequently the double clutch as well are, before the complete positive withdrawal of the engaging claws, already under spring action in the operative direction in such a manner that, on the claws being completely withdrawn, a sudden and absolutely certain reversal is ensured.

In Figures 5 and 6, it can be seen that the reversing mechanism is carried by a closed cast metal housing supported on the spinning frame, and this mechanism is driven by the delivery cylinder shaft 1. The up and down movement of the draw spindle 11, which is to be controlled by the stroke limiting lugs 16 and 17, is itself formed through the chain 26 passing over roller 27 and roller 28 to which the end of the chain 26 is secured for the rotary motion of the stroke shaft 29 shown in Figure 5, the roller 28 being splined to the shaft 29. On the shaft 29, are splined chain rollers 30 and 30' which through chains 31 and 31' are connected to slide rails 32 arranged on opposite sides of the spinning frame and extending throughout the length thereof in a conventional manner.

Pull chains 34 are fastened on these side rails by suitable clamping pieces 33, the pull chains passing over guide rollers 35 journalled on the vertical upright of the frame and leading to stroke slides 37 to which they are connected by screws 36. The stroke slides, on which the ring rail is mounted, are slidably arranged on rigid columns of the machine frame.

On upward movement of the spindle 11, the slide rails 32 are pulled by the chains 26 and 31, 31' to the right toward the driving side and thus stroke slides 37 attached to the ring rail 38 are moved upwardly by the chains 34. The weight of the ring rail and stroke slides acting on the chains 26, 31, 31' and 34 maintains these members under tension so that during downward movement of the spindle 11, the ring rail and stroke slides, due to their own weight, slide downwardly on the guide columns.

After each double stroke, of the ring rail, or at each setting of downward motion of the spindle 13 and control shaft 15 fixed thereto, the control shaft is turned by the ratchet wheel 24 through a definite angle. These successive rotary setting motions of the spindle 13 imparts to the lugs or stops 16 and 17 different movements in accordance with the configuration, arrangement and guidability of these members so as to result in different windings being effected as described hereafter.

Referring more specifically to the connection between the control lever 22 and the setting lever 23, it will be noted in Figures 16 and 17 that the lever 22 is rotatably mounted in the housing of the reversal drive as at H and the same includes an outer lever part 22 and an inner part within the housing. Such inner part includes a pointed portion 22a and opposite thereto, a recess 22b. Bolt 40 is mounted in the housing wall H and the lever 23 is pivoted at one end of this bolt. A pin 41 projecting from one side of the lever 23 engages in the recess 22b and a pin 42 projecting from the opposite face of the lever 23 carries a roller or stud 43 which engages in an annular groove in the clutch body 9. A roller 44 is carried in the other end of the lever 23 and is mounted on an axle 45 which is slidable and rotatable in slots 49 formed in the lever 23. Axial bores 47 and 48 extend inwardly from the free end of the lever 23 and spring members are mounted in the bores and an end plate 46 carried by the end of the lever closes the bores so that the spring members bear between the end plate and the opposite end portions of the axle 45 to tend to constantly urge the axle toward the central portion of the lever.

In the position illustrated, the double clutch 9 is in engagement with the lower gear wheel 10.

If the lever 22 is turned in the clockwise direction, through the operation of the control shaft 15 and the clutch plate 20, the roller 44 is pressed by the one angle surface of the lever end 22a toward the right, stressing the springs that are in the bores 47 and 48. This action causes the lever 23 to hold double clutch 9 into engagement with the pin 42 and roller 43 into firm engagement with the lower gear wheel 7. Upon further rotation of the lever 22 in a clockwise direction the lower wall of the recess 22b abuts pin 41 thus urging the lever 23 upwardly so as to start withdrawal of the lower clutch jaws of the clutch 9 from the jaws on the gear wheel 7. Prior to completely separating the clutching jaws, the apex of the pointed end 22a has travelled past the mid portion of the roller 44 so that under spring pressure action on the axle 45, the roller in conjunction with the upper angle surface on the inner part 22 tends to abruptly swing the lever 23 upwardly into engagement with the claws on the upper gear wheel 8 whereby the reversal is effected and the mechanism conditioned for repetition of these movements in the opposite direction.

As to the connection between the clutch 9 and the nut 10, it will be seen in Figure 18 that key 50 is fastened on the gear housing which engages in a longitudinal groove of the draw spindle to prevent the same from turning.

In Figures 19 and 20, the ratchet wheel 24 is provided with a hub that is journalled in the journal 19. The shaft 15 passes through a bore in the ratchet wheel, is axially slidable therethrough and coupled therewith by a wedge or key 67. A ring 65 is rotatably mounted on the shaft 15 and a crank wheel 66 is fixed to the shaft above the ring. A journal support 52 is bolted on the housing and within the support is journalled a pin or shaft 55 having its axis transverse to the axis of the shaft 15, the pin carrying levers 53 and 54 at the opposite ends thereof. In a recess of the journal support, a rod 56 is slidably guided. A spring 61 lies between a pin 62 and the end of the rod 56 and normally urges the rod outwardly of its accommodating recess. A pin 68 carried by the rod 56 projects through a slot in the journal and is engageable with the lever 54. A plate 60 is guided about the hub of the wheel 24 and carries a pin for engagement with the pawl lever arm 57 and pawl 58. A pressure spring 59 reacts against a down-turned lug on the plate 60 and against the outer face of the pawl 58 to hold resiliently the same in engagement with the rigid teeth of the wheel 24. By setting screw 63 and safety nut 64, the amount of setting movement can be adjusted. The crank wheel 66 provides for the manual adjustment of the lugs 16 and 17.

The control shaft 15 is shown in the uppermost position in Figures 19 and 20 and if the shaft is pulled downwardly due to the engagement of the member 12 with the lower stop 16, setting ring 65 presses the lever 53 downwardly and turns this lever and the lever 54 in a clockwise direction. During this operation, pin 68 is engaged by the lever 54 and thereby the setting rod 56 is moved to the left, the wheel 24 (viewed from above) thus turning clockwise and rotating shaft 15 by virtue of the wedge connection 67.

During the upward setting of the shaft 15, the whole system is subjected to the influence of the pressure springs 61 and restored to the position depicted, the spring pawl 58 sliding back over the teeth of the ratchet wheel 24. Thus, the downward movement of the shaft 15 effects the indexing of the ratchet wheel to rotate the shaft 15 and vary the position of stop lugs shown in Figures 1 and 4 and the cam surfaces of Figures 2 and 3.

The reversal takes place as follows: On the drawspindle 11 moving for instance downwards, the stop member 12 will bear against the stroke limiting stop 16 and will draw the latter and with it the stop spindle 13, control shaft 15 and clutch plate 20 downwards, until through the turning of the control lever 22 the double clutch 9 is completely withdrawn from the clutch claws of one of the worm wheels, whereupon the double clutch snaps into the clutch claws of the other worm wheel, causing the motion of the draw-spindle 11 and consequently of the ring or spindle rail to be reversed. On the drawspindle 11 then moving upwards, the stop member 12 will come against the stroke limiting stop 17 and will push all the operative elements upwards with it, until through the opposite rocking motion of the control lever 22 the double clutch again reverses.

On each downward motion of the spindle 15 taking place, the latter along with the stop spindle 13 rigidly connected to it will be turned to a greater or less extent by a ratchet wheel 24 actuated by a lever and pawl, whereby in conunction with the exchangeable, differently shaped stroke limiting stops the greatest variety of kinds of winding can be produced.

In Figures 1 to 4 various stroke limiting stops for different kinds of winding are illustrated.

Figure 1 shows stroke limiting stops for cop winding. In this case the stops 16, 17 are combined in one part and the stop spindle 13 has the form of a threaded spindle. The stop part 16, 17 is secured against turning by the guide rod 25, so that, on the stop spindle 13 turning, the stop part will be moved further and further upwards, whereby the ring or spindle rail will also be caused to move upwards and the thread thereby wound on in cop winding. The stop 16 is formed by an adjustable screw, by means of which the magnitude of the single stroke can be easily varied, which has hitherto only been possible by changing the cam, which involved much trouble.

Figure 2 shows stroke limiting stops for parallel winding with a cone at the spool point. In this case the stop spindle is a smooth shaft, on which the stroke limiting stops 16 and 17 are fixed by screws at the distance apart corresponding to each bobbin length. In this arrangement the stops 16 and 17 turn with the stop spindle 13, whereby the lift of the ring or spindle rail is alternately shortened and lengthened again by the upper stop 17 which has the form of a cam drum, which results in the forming of a cone at the spool point.

Figure 3 shows the stop spindle with stroke limiting stops for double cone winding by displacing the stroke. In this case the disc-shaped stop 16 of Figure 2 is changed for a second cam drum. In the position of the two cam drums to one another, shown in the figure, the stroke will always be of the same size, on the stop spindle 13 turning, and will only be alternately displaced upwards and downwards, whereby the spool will be given a conical shape at the point and at the foot. If one of the two cam drums be fixed on the stop spindle 13 turned through 180°, a double cone winding will also be obtained, but in this case through constant change in the length of stroke.

Figure 4 shows the stop spindle 13 with stroke limiting stops for parallel winding with two cones by shortening the stroke. In this case the stop spindle 13 is made in the form of a double spindle with right-handed and left-handed thread, on which, on the stop spindle 13 turning, two separate stops 16 and 17, which are secured against turning by a guide rod 25, approach one another and thereby continuously shorten the stroke, whereby two cones are formed on the spool.

In Figure 7, the stroke limiting assembly consists of a lift-hand threaded screw spindle 13 and two lugs 16 and 17 carried by one piece. Thus, a fundamental structure corresponding to spool cone height which is shifted successively upward by the simultaneous screwing upwardly of the lugs 16 and 17 due to the rotary setting movements of the spindle so that winding has the appearance diagrammatically shown.

In Figure 8, the left-hand threaded spindle 13 receives discrete spaced lugs 16 and 17 which move upwards at a constant distance, this defining a large stroke shifted about the spool cone height in upward steps as shown to the right of the figure.

In Figure 9, the spindle 13 has spaced right and left hand threaded sections cooperating respectively with upper and lower stop lugs 17 and 16. Upon the rotation of the spindle, lug 17 moves downwardly and lug 16 upwardly. The winding results illustrated are due to the shortening of the stroke control.

In Figure 10, the spindle has left-hand threads for the up lug 17 and right-hand threads for the lower lug 16 so that rotation of the spindle 13 causes the lugs to move away from each other resulting in the appearance shown in the figure.

In all these aforementioned arrangements, a guide bar 25 is used cooperating with the lugs 16 and 17 to constrain the same for axial movement along the spindle 13. Prior to a new winding operation, the spindle 13 is turned by the hand crank 66 until one of the lugs abuts the setting ring 39 whereupon the winding-on position of the ring bench is again adjusted.

The assemblies shown in Figures 11 to 15 yield windings which permit the continuous removal of the full spools so that the machine need not be stopped. This allows of the complete exchange of empty spools for full spools while the machine is in operation.

The lug spindles in these figures are smooth shafts on which the lugs are firmly threaded at distances apart corresponding to the cop or coil lengths. Hence, the lugs participate in the step-like rotational movement of the spindle 13 effected by the ratchet wheel 24. Since the lugs are of different shape or different cam surface arrangement, the stroke of the spindle 11 and thus the bench 38 remains either always equal, Figure 15, continuously shifted, Figure 11, continuously changed, Figures 12 and 13, or continuously shifted and changed, Figure 14.

In Figure 11, the lugs are curved cam discs, the rise of the cam surfaces corresponding to the spool cone height. The stroke is constant and continuously shifted upwardly and downwardly so that the winding has the appearance shown.

In Figure 12, the lug 16 is displaced 180 degrees with respect to the lug 17, as compared with the position it had in Figure 11, resulting in the continuous changing feature.

In Figure 13, the lug 17 is a cam whereas the lug 16 is a planar surface or disc. The slide rail stroke on the spool basis always goes to the same spot and a spool apex is continuously shortened and lengthened resulting in the appearance depicted.

Figure 14 shows the same arrangement except that the lug 16 is not a disc but a cam with a lower curved surface. Thus, the stroke is constantly shifted and changed.

In Figure 15, the lugs 16 and 17 are both smooth discs, the ring plate stroke remaining constant and always sweeping the same space, thereby obtaining a cylindrical winding on the discs of the spools.

While the foregoing do not exhaust all possibilities for the invention, they do serve to illustrate the essence of the invention, namely the provision for obtaining most of the different type windings resulting in spinning and like frames by the simple interchangeability of the stroke limiting unit.

The acuteness of the angle, at which the threads of the individual thread layers on the spool cross one another, can be determined by suitable choice of the transmission ratio of the two pairs of worm wheels 2, 7 and 6, 8.

The most important feature of the invention is thus, to recapitulate shortly, that through the use of a universal reversing gear it is possible, simply by changing differently shaped and differently moved stroke limiting stops, to change from one kind of winding to another. Any wear which is sure to occur in the course of time in every mechanical gear has in this arrangement no influence on the exactness of the spool winding.

The arrangement necessitates no special construction of the frame and can be built into practically all frames which have hitherto operated with cams.

The arrangement enables bobbins of different lengths to be wound on, without any part having to be changed. Bobbins of unusually great lengths, which in frames with cams can only be wound with great difficulty or not at all, can be spooled with this arrangement without trouble and in a completely satisfactory manner.

The term "interchangeable" used in the claims has reference to members of different shape or configuration and/or differently arranged.

I claim:

1. In a winding mechanism for spinning, twisted and like frames, a horizontally disposed ring rail mounted for upward and downward movement relative to a plurality of rotatable bobbins, a horizontally reciprocable slide rail, means connecting the ring rail to the slide rail and a drive assembly operatively connected to the slide rail, such drive assembly comprising a reversing mechanism, a vertically reciprocable draw spindle, a drive connection between the draw spindle and the slide rail, movable clutch means incorporated in the reversing mechanism and movably operable between two positions to transmit opposite reciprocating movements to the draw spindle, a fixed abutment on the draw spindle, a rotatable control shaft laterally spaced from and parallel to the draw spindle, a stop spindle at the lower end of the control shaft, interchangeable axially spaced stop elements carried by the stop spindle, the stop elements projecting laterally of the stop spindle and the abutment on the draw spindle being movable between and engageable with the stop elements, means mounting the control shaft for axial movement so that when the draw spindle reciprocates, the fixed abutment will engage one of the stop elements to move the control shaft axially in a direction corresponding to the direction of movement of the draw spindle, means connected to the control shaft and the clutch means responsive to the axial movement of the control shaft to reverse the movement of the draw spindle permitting corresponding reverse movement of the slide rail and the ring rail through the drive connection between the draw spindle and the slide rail, ratchet means on the control shaft, and means cooperable with the ratchet means to partially rotate the control shaft to change the position of the stop elements relative to the fixed abutment on the downward movement of the ring rail.

2. A winding arrangement as claimed in claim 1 in which said clutch means includes a double claw clutch member, said reversing means comprising axially spaced oppositely rotating power imparting members having facing claw surfaces cooperative with said clutch member, an internally threaded nut upon which said clutch member is axially movable, said draw spindle being externally threaded and axially movable within and relative to said nut, and means for constraining said draw spindle for axial movement only.

3. A winding arrangement as claimed in claim 2, in which said means connected to the control shaft and the clutch means comprises an actuating lever operatively connected with said clutch member to move the same axially in opposite directions, a control lever for actuating said first mentioned lever, a coupling plate axially movable with said control shaft, and means connecting said plate to said control lever whereby reciprocation of the plate responsive to reciprocation of the control shaft actuates said levers to shift said clutch.

4. A winding arrangement as claimed in claim 1 in which said clutch means includes a double claw clutch member, said reversing means comprising axially spaced oppositely rotating power imparting members having facing claw surfaces cooperative with said clutch member, an internally threaded nut upon which said clutch member is axially movable, said draw spindle being externally threaded and axially movable within and relative to said nut, means for constraining said draw spindle for axial movement only, and spring means cooperably associated with said axially movable clutch member and operative to snap said member out of engagement with one of said wheels and into engagement with the other upon actuation of the control.

References Cited in the file of this patent

UNITED STATES PATENTS

| | | |
|---|---|---|
| 1,308,104 | Parsons | July 1, 1919 |
| 1,535,036 | Potter | Apr. 21, 1925 |
| 1,668,786 | Spalsbury | May 8, 1928 |
| 2,306,045 | Delano | Dec. 22, 1942 |
| 2,396,958 | Mackmann | Mar. 19, 1946 |
| 2,473,566 | Brassell | June 21, 1949 |
| 2,507,733 | Mott | May 16, 1950 |
| 2,513,815 | Nelson | July 4, 1950 |
| 2,539,267 | Nickles | Jan. 23, 1951 |
| 2,575,031 | Smith | Nov. 13, 1951 |